United States Patent [19]

Nishihara et al.

[11] 3,763,048

[45] Oct. 2, 1973

[54] STABILIZATION OF HALOGENATED HYDROCARBONS

[75] Inventors: Akio Nishihara; Shizuo Nakamura, both of Urawa, Japan

[73] Assignee: Asahi Denka Kogyo Kabushiki Kaisha, Tokyo, Japan

[22] Filed: May 4, 1971

[21] Appl. No.: 140,268

[30] Foreign Application Priority Data
Aug. 31, 1970 Japan.............................. 45/75608
Dec. 9, 1970 Japan............................ 45/108520

[52] U.S. Cl............................. 252/171, 260/652.5
[51] Int. Cl. ....... C09d 9/00, C11d 7/50, C23g 5/02
[58] Field of Search........................... 252/171, 170; 260/327 E, 327 M, 327 S, 652.5

[56] References Cited
UNITED STATES PATENTS

| | | |
|---|---|---|
| 3,505,415 | 4/1970 | Richtzenhain et al........... 260/652.5 |
| 3,499,047 | 3/1970 | Cormang et al. ................ 260/652.5 |
| 2,183,860 | 12/1939 | Coltof............................. 260/327 E |
| 2,440,100 | 4/1948 | Klabunde......................... 260/652.5 |
| 3,384,673 | 5/1968 | Blanbenship et al. ........... 260/652.5 |
| 3,445,527 | 5/1969 | Obamura......................... 260/652.5 |
| 3,467,722 | 9/1969 | Archer et al..................... 260/652.5 |

*Primary Examiner*—William E. Schulz
*Attorney*—Wenderoth, Lind & Ponack

[57] ABSTRACT

This invention relates to the stabilization of halogenated hydrocarbons, and, more particularly, to the stabilization of methyl chloroform by the addition thereto of at least one sulfur-containing heterocyclic compound selected from 1,3-dithiolane, 1,3-oxathiolane and certain thiirane compounds in the presence or absence of at least one auxilliary stabilizing additive selected from acetonitrile, nitromethane, glycidol, 1,3-dioxolane or 1,4-dioxane.

8 Claims, No Drawings

STABILIZATION OF HALOGENATED HYDROCARBONS

This invention relates to the stabilization of halogenated hydrocarbons, and particularly to the stabilization of chlorinated hydrocarbons having a 1,1,1-trichloromethyl group, such as methyl chloroform (or 1,1,1-trichloroethane), perchloroethane, chloroform and pentachloroethane, more particularly to the stabilization of methyl chloroform.

Halogenated hydrocarbons are very useful in the wide ranges of applications, for example, for the degreasing or the cleaning of metals, plastics, textiles or other materials.

It is well known that halogenated hydrocarbons, more particularly methyl chloroform, are unstable and they are decomposed to produce a black substance like tar while releasing hydrogen chloride, phosgene or the like by the action of light, air, heat, water, acid, metal salts or metals such as aluminum, magnesium and their alloys.

Corrosion of metal surfaces of containers and process equipments and deterioration of the solvents in the quality due to the formation of acidic and colored byproducts become serious problems in the industry.

For example, aluminum is corroded when it is contact with unstabilized methyl chloroform, then methyl chloroform becomes a black substance like a tar or a carbonized lump. In order to prevent the corrosion of metals and deterioration of halogenated hydrocarbon solvents, stabilizers such as glycol diesters, ketones, nitriles, dialkylsulfoxides, tertiary butyl alcohol, tetrahydrofuran, 1,4-dioxane, trimethylene sulfide, and 3-hydroxytrimethylene sulfide are commonly added to these solvents.

However, those customary stabilizers can not sufficiently prevent the corrosion of metals and deterioration of halogenated hydrocarbon solvents. Methyl chloroform poses a particularly difficult stabilization problem because of its unusual reactivity with certain metals, notably aluminum.

It is an object of this invention to provide new stabilizers for halogenated hydrocarbons and stabilized halogenated hydrocarbon compositions.

Accordingly, it is another object of this invention to provide a new method of stabilizing halogenated hydrocarbons, particularly methyl chloroform, during the storage and application of said hydrocarbons.

We have now found that the stabilization of halogenated hydrocarbons can satisfactory be achieved by the addition of at least one of sulfur-containing heterocyclic compounds selected from the group consisting of 1,3-dithiolane ($C_3H_6S_2$), 1,3-oxathiolane ($C_3H_6OS$) and thiirane compounds containing 2 to 8 carbon atoms and having the general formula:

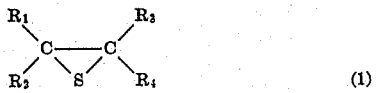

Wherein each of $R_1$ and $R_3$ individually represents a member selected from the group consisting of hydrogen, alkyl, halogenated alkyl, hydroxyalkyl, alkoxyalkyl, acyloxyalkyl, mercaptoalkyl, alkylmercaptoalkyl, acylmercaptoalkyl and phenyl, and together $R_1$ and $R_3$ may also represent a polymethylene group such as 1,3-trimethylene or 1,4-tetramethylene and each of $R_2$ and $R_4$ individually represents a member selected from the group consisting of hydrogen, alkyl, halogenated alkyl, hydroxyalkyl, alkoxyalkyl, acyloxyalkyl, mercaptoalkyl, alkylmercaptoalkyl, acylmercaptoalkyl and phenyl.

We also have found that when the sulfur-containing heterocyclic compound selected from the group consisting of 1,3-dithiolane ($C_3H_6S_2$), 1,3-oxathiolane ($C_3H_6OS$) and thiirane compounds containing two to 8 carbon atoms and having the above mentioned general formula (1) is used in combination with at least one of assistant stabilizing additives selected from the group comprising of alkylnitriles, nitroalkanes and cyclic ether compounds having a three to six-membered ring containing one to two oxygen atoms, the stabilization of halogenated hydrocarbons are enhanced.

The stabilizers of this invention can be used for the stabilization of any halogenated hydrocarbons having up to four carbon atoms, particularly chlorinated lower hydrocarbons having a 1,1,1-trichloromethyl group, for example, methyl chloroform, perchloroethane, chloroform, pentachlorolthane and carbon tetrachloride, and more particularly methyl chloroform.

Other examples of halogenated hydrocarbons include trichloroethylene, methyl chloride, 1,1,2-trichloroethane, tetrachloroethane, vinylidene chloride, 1,2-dichloroethylene and vinyl chloride.

The thiirane compounds represented by the general formula (1) are classified into those having the general formula:

wherein $R_5$ is a member selected from the group consisting of a hydrogen atom, alkyl groups having one to two carbon atoms and a phenyl group, formula examples of the thiirane compounds having the general formaul (1 - 1) include ethylene sulfide, propylene sulfide, 1-butene sulfide and epithiostyrene but they are not limited in this invention.

Also, the thiirane compounds represented by the general formula (1) are classified into those having the general formula:

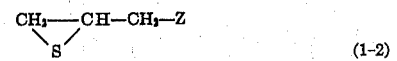

wherein Z is a member selected from the group consisting of halogen atoms (preferably a chlorine atom), a hydroxy group, an alkoxy group, an acyloxy group, a mercapto group, an alkylmercapto group and an acylmercapto group, and examples of the thiirane compounds having the general formula (1 - 2) include, but are not limited to, 1,2-epithio-3-chloropropane, 1,2-epithio-3-hydroxypropane, 1,2-epithio-3-methoxypropane, 1,2-epithio-3-ethoxypropane, 1,2-epithio-3-isopropoxypropane, 1,2-epithio-3-tertiary-butoxypropane, 1,2-epithio-3-acetoxypropane, 1,2-epithio-3-propyonyloxypropane, 1,2-epithio-3-mercaptopropane, 1,2-epithio-3-methylmercaptopropane, 1,2-epithio-3-ethylmercaptopropane, 1,2-epithio-3isopropylmercaptopropane, 1,2-epithio-3-acetylmercaptopropane and 1,2-epithio-3-propyonylmercaptopropane.

Still further the thiirane compounds represented by the general formula (1) are classified into those having the general formula:

(1-3)

wherein n ranges from 3 to 4, and examples of thiirane compounds having the general formula (1 - 3) include, but are not limited to, 1,2-cyclopentylene sulfide and 1,2-cyclohexylene sulfide.

The sulfur-containing heterocyclic compounds, that is, 1,3-dithiolane, 1,3-oxathiolane or thiirane compounds may be used in an amount between 0.01% and 10%, preferably between 0.01% and 5% by weight of the halogenated hydrocarbons.

Examples of alkylnitriles which can be used in combination with at least one of the sulfur-containing heterocyclic compounds include, for example, acetonitrile, propionitrile, butyronitrile, valeronitrile, capronitrile and caprylonitrile.

It is preferable to use the alkylnitriles having two to four carbon atoms and acetonitrile is the best example among the alkylnitriles.

Examples of nitroalkanes which can be used in combination with at least one of the sulfur-containing heterocyclic compounds include, for example, nitromethane, nitroethane, nitropropane, nitrobutane and nitrohexane.

It is preferable to use the nitroalkanes having one to four carbon atoms and nitromethane is the best example of the nitroalkanes.

Examples of cyclic ether compounds having a three to six - membered ring containing one or two oxygen atoms, which can be used in combination with at least one of the sulfur-containing heterocyclic compounds, include, for example, epoxy compounds containing a three-membered epoxy ring such as propylene oxide, butylene oxide, isobutylene oxide, pentene oxide, 2-methyl-2,3-epoxy butane, butadiene dioxide, cyclopentene oxide, cyclohexene oxide, styrene oxide, 2-methyl-styrene oxide, epichlorohydrin, glycidol, glycidyl acetate, glycidyl propionate, diglycidyl ether, methyl glycidyl ether, ethyl glycidyl ether, phenyl glycidyl ether and 2-hydroxy-2,3-epoxypropane; cyclic ether compounds containing a four-memebered ring such as oxetane, 1,3-epoxy butane and 3,3-bis-chloromethyl oxetane; cyclic ether compounds containing a five-membered ring such as tetrahydrofuran, tetrahydro-2-methylfuran, 3-hydroxy-tetrahydrofuran, and 1,3-dioxolane; and cyclic ether compounds containing a six-membered ring such as 1,4-dioxane and tetrahydropyran.

Preferable examples of the cyclic ether compounds which can be used in combination with at least one of the sulfur-containing heterocyclic compounds include, for example, glycidol, glycidyl acetate, glycidyl propionate, diglycidyl ether, methyl glycidyl ether, 3-hydroxy-tetrahydrofuran, 1,3-dioxorane and 1,4-dioxane.

Glycidol, 1,3-dioxolane and 1,4-dioxane are the preferred examples of the cyclic ether compounds.

The assistant stabilizing additive selected from the group consisting of alkylnitriles, nitroalkanes and cyclic ether compounds is used in an amount between 0.01% and 10%, preferably between 0.01% and 3%, by weight of the halogenated hydrocarbons.

The synergistic effect of the two or more ingredients of the stabilizing system will be demonstrated by the following examples, wherein it is shown that the two ingredients are far more effective than that of each of them, particularly in the cases of vapour degreasing solvents.

It must be understood that the stabilizers used in this invention may be used in combination with other known conventional stabilizers.

An effect of this invention is to be able to provide an exceedingly stabilized halogenated hydrocarbon composition.

Another effect of this invention is to be able to provide stabilized halogenated hydrocarbon compositions which are useful as metal degreasing solvents, oil extracting solvents, cleaning solvents or other industrial solvents.

The stabilizers of this invention are particularly useful for the stabilization of methyl chloroform during its storage or application.

Further, another effect of this invention is to be able to remove grease from metals in the vapour phase degreasing technique by using a stabilized methyl chloroform composition.

The highly stabilized methyl chloroform composition according to this invention is useful as, for example, metal degreasing solvent, dry cleaning solvent, photographic film cleaning solvent and solvent for chemical processes.

The invention is illustrated but not limited by the following examples.

EXAMPLE 1 - 19.

In order to show the stabilizing effects of stabilizers of this invention on methyl chloroform, the following test was carried out.

Into a 300 ml. glass apparatus equipped with a reflux condenser, 100 ml. of a methyl chloroform composition containing a stabilizer were added. Then, an aluminum alloy test piece (20 mm × 20 mm × 1 mm which alloy contained : Cu 4.6%, Si maximum 0.5%, Fe maximum 0.5%, Mn 0.6%, Mg 1.5%, the balance Al) was immersed in the composition, and the composition was refluxed for 5 hours while the test piece was submerged in the fluid.

Table 1 shows the test results obtained in the cases using various kinds of the stabilizers.

When the aluminum alloy test piece was immersed in the refluxing unstabilized methyl chloroform, an immediate and violent reaction occurred and methyl chloroform was converted into tar.

For the comparison, the results of the tests carried out by using the following stabilizers are also indicated in Table I: nitroethane, propylene oxide, 1,2-butylene oxide, epichlorohydrin, propylmercaptan, methyl isopropyl sulfide and ethyl propyl sulfide.

In Table I, concentrations of the stabilizers are percentages by weight of the composition.

TABLE I

| Example Nos. | Stabilizers | Concentration (%) | State of test piece after 5hrs. |
|---|---|---|---|

| | | | |
|---|---|---|---|
| 1 | ethylene sulfide | 1.0 | no change |
| 2 | propylene sulfide | 1.0 | " |
| 3 | Propylene sulfide | 0.5 | " |
| 4 | 1,2-epithio-3-hydroxypropare | 1.0 | " |
| 5 | 1,2-epithio-3-hydroxypropane | 0.5 | " |
| 6 | 1,2-epithio-3-chloropropane | 1.0 | " |
| 7 | 1,2-epithio-3-chloropropane | 0.5 | " |
| 8 | 1-butene sulfide | 1.0 | " |
| 9 | 1,2-epithio-3-methoxypropane | 1.0 | " |
| 10 | 1,2-epithio-3-mercaptopropane | 1.2 | " |
| 11 | 1,2-epithio-3-ethylmercapto-propane | 1.0 | " |
| 12 | 1,2-epithio-3-acetylmercapto-propane | 1.0 | " |
| 13 | epithiostyrene | 1.0 | " |
| 14 | 1,2-cyclopentylene sulfide | 1.0 | " |
| 15 | 1,2-cyclohexylene sulfide | 1.0 | " |
| 16 | 1,3-dithiolane | 1.0 | " |
| 17 | 1,3-oxathiolane | 1.0 | " |
| 18 | { propylene sulfide / 1,2-epithio-3-hydroxypropane | 0.5 / 0.5 | " |
| 19 | { 1,2-epithio-3-chloropropane / 1,3-dithiolane | 0.5 / 0.5 | " |
| comparative(1) | nitroethane | 1.0 | corrosive |
| ex-(2) | propylene oxide | 1.0 | " |
| ample(3) | 1,2-butylene oxide | 1.0 | " |
| (4) | epichlorohydrin | 1.0 | " |
| (5) | methyl isopropyl sulfide | 1.0 | " |
| (6) | propylmercaptane | 1.0 | " |
| (7) | styrene oxide | 1.0 | " |

EXAMPLES 20 – 57.

These examples show the stabilizing effect of stabilizers of this invention on methyl chloroform, in the vapour phase of methyl chloroform compositions.

Into 300 ml. glass apparatus equipped with a reflux condenser, 100 ml. of a methyl chloroform composition containing stabilizers were added.

Then, an aluminum alloy test piece, which is the same as that used in examples 1 to 19, was placed by hanging at the bottom part of the reflux condenser, and the composition was refluxed while the test piece was exposed to the hot vapour of stabilized methyl chloroform.

The stabilizing effect may be judged by measuring the refluxing time until corrosion occurs on the aluminum alloy test piece, or black spot occurs on the aluminum alloy test piece, or the methyl chloroform turns colour, or the methyl chloroform is converted into tar.

Table II shows the test results obtained in the cases using various kinds of the stabilizers.

TABLE II

| Example Nos. | Stabilizers | Concentration | Refluxing time |
|---|---|---|---|
| 20 | propylene sulfide | 0.5 | 43 |
| 21 | propylene sulfide | 1.0 | >120 |
| 22 | 1,2-epithio-3-chloropropane | 0.5 | 39 |
| 23 | 1,2-epithio-3-chloropropane | 1.0 | >120 |
| 24 | 1,2-epithio-3-hydroxypropane | 0.5 | 48 |
| 25 | 1,2-epithio-3-hydroxypropane | 1.0 | >120 |
| 26 | 1,2-cyclopentylene sulfide | 0.5 | 36 |
| 27 | 1,2-cyclopentylene sulfide | 1.0 | >120 |
| 28 | 1,3-dithiolane | 0.3 | 25 |
| 29 | 1,3-dithiolane | 1.0 | >120 |
| 30 | 1,3-oxathiolane | 0.3 | 24 |
| 31 | 1,3-oxathiolane | 1.0 | >120 |
| 32 | { propylene sulfide / 1,4-dioxane | 0.3 / 0.5 | >120 |
| 33 | { propylene sulfide / glycidol | 0.3 / 0.5 | >120 |
| 34 | { 1,2-epithio-3-chloropropane / nitromethane | 0.3 / 0.5 | >120 |
| 35 | { 1,2-epithio-3-hydroxypropane / 1,3-dioxolane | 0.3 / 0.5 | >120 |
| 36 | { 1,2-epithio-3-hydroxypropane / acetonitrile | 0.3 / 0.5 | >120 |
| 37 | { 1,3-dithiolane / 1,3-dioxolane | 0.25 / 0.5 | >120 |
| 38 | { 1,3-dithiolane / glycidol | 0.25 / 0.5 | >120 |
| 39 | { 1,3-oxathiolane / 1,4-dioxane | 0.25 / 0.5 | >120 |
| 40 | { 1,3-dithiolane / nitromethane | 0.25 / 0.5 | >120 |
| 41 | { 1,3-dithiolane / 1,4-dioxane | 0.25 / 0.5 | >120 |
| 42 | { 1,3-oxathiolane / acetonitrile | 0.25 / 0.5 | >120 |
| 43 | { 1,3-oxathiolane / 1,3-dioxolane | 0.25 / 0.5 | 110 |
| 44 | { 1,3-oxathiolane / glycidol | 0.25 / 0.5 | >120 |
| 45 | { 1,2-cyclopentylene sulfide / 1,3-dioxolane | 0.3 / 0.5 | >120 |
| 46 | { 1,3-dithiolane / 1,3-oxathiolane | 0.3 / 0.3 | 65 |
| 47 | { 1,3-dithiolane / acetonitrile | 0.25 / 0.5 | >120 |
| 48 | { 1,3-oxathiolane / nitromethane | 0.25 / 0.5 | >120 |
| 49 | { propylene sulfide / acetonitrile | 0.3 / 0.5 | >120 |
| 50 | { propylene sulfide / nitromethane | 0.25 / 0.5 | >120 |
| 51 | { propylene sulfide / 1,3-dioxolane | 0.25 / 0.5 | >120 |
| 52 | { 1,2-epithio-3-hydroxypropane / glycidol | 0.3 / 0.5 | >120 |
| 53 | { 1,2-epithio-3-chloropropane / 1,4-dioxane | 0.25 / 0.5 | >120 |
| 54 | { 1,2-cyclopentylene sulfide / acctonitrile | 0.3 / 0.5 | >120 |
| 55 | { 1,2-cyclopentylene sulfide / nitromethane | 0.3 / 0.5 | >120 |
| 56 | { 1,2-cyclopentylene sulfide / glycidol | 0.3 / 0.5 | >120 |
| 57 | { 1,2-cyclohexylene sulfide / 1,4-dioxane | 0.3 / 0.5 | >120 |
| Comparative example | | | |
| (8) | epichlorohydrin | 1.0 | 0.5 |
| (9) | nitromethane | 0.75 | 5 |
| (10) | 1,3-dioxolane | 0.75 | 2 |
| (11) | 1,4-dioxane | 0.75 | 3 |
| (12) | acetonitrile | 0.75 | 15 |
| (13) | glycidol | 0.75 | 18 |
| (14) | tetrahydrofuran | 1.0 | 13 |

What we claim is that:

1. Methyl chloroform stabilized by having dissolved therein a stabilizing amount of at least one sulfur-containing heterocyclic compound selected from the group consisting of 1,3-dithiolane, 1,3-oxathiolane and thiirane compounds containing two to 8 carbon atoms and having the general formula:

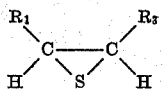

wherein each of $R_1$ and $R_3$ individually represents a member selected from the group consisting of hydrogen, an alkyl group having one to two carbon atoms, a phenyl group, a halogenated methyl group, a hydroxy methyl group, an alkoxy methyl group having two to five carbon atoms, an acyloxy methyl group having three to four carbon atoms, a mercapto methyl group, an alkylmercapto methyl group having two to four carbon atoms, and an acylmercapto methyl group having three to four carbon atoms, and together $R_1$ and $R_3$ may also represent a 1,3-trimethylene or 1,4-tetramethylene group.

2. Methyl chloroform stabilized by having dissolved therein a stabilizing amount of at least one sulfur-containing heterocyclic compound selected from the group consisting of 1,3-dithiolane, 1,3-oxathiolane, 1,2-cyclopentylene sulfide, 1,2-cyclohexylene sulfide and thiirane compounds having the general formula:

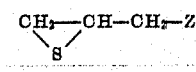

wherein Z is a member selected from the group consisting of a chlorine atom, a hydroxy group, an alkoxy group having one to four carbon atoms, an acyloxy group having two to three carbon atoms, a mercapto group, an alkyl mercapto group having one to three carbon atoms, and an acylmercapto group having two to three carbon atoms.

3. Methyl chloroform stabilized by having dissolved therein a stabilizing amount of at least one thiirane compound having the general formula:

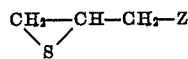

wherein Z is a member selected from the group consisting of a methoxy group, an ethyl mercapto group, an acetyl mercapto group, and a chlorine atom.

4. Methyl chloroform stabilized by having dissolved therein a stabilizing amount of at least one sulfur-containing heterocyclic compound selected from the group consisting of 1,3-dithiolane and 1,3-oxathiolane, and an effective amount of at least one auxilliary stabilizing additive selected from the group consisting of acetonitrile, nitromethane, glycidol, 1,3-dioxolane, and 1,4-dioxane.

5. Methyl chloroform stabilized by having dissolved therein a stabilizing amount of 1,2-cyclopentylene sulfide and an effective amount of at least one auxilliary stabilizing additive selected from the group consisting of acetonitrile, nitromethane, glycidol, and 1,3-dioxolane.

6. Methyl chloroform stabilized by having dissolved therein a stabilizing amount of 1,2-cyclohexylene sulfide, and an effective amount of 1,4-dioxane as an auxilliary stabilizing additive.

7. Methyl chloroform stabilized by having dissolved therein a stabilizing amount of 1,2-epithio-3-hydroxypropane and an effective amount of at least one auxilliary stabilizing additive selected from the group consisting of acetonitrile, glycidol and 1,3-dioxolane.

8. Methyl chloroform stabilized by having dissolved therein a stabilizing amount of 1,2-epithio-3-chloropropane and an effective amount of at least one auxilliary stabilizing additive selected from the group consisting of nitromethane and 1,4-dioxane.

* * * * *